(12) United States Patent
Elliott et al.

(10) Patent No.: US 6,317,681 B2
(45) Date of Patent: Nov. 13, 2001

(54) METHOD FOR MONITORING THE OPERATION OF SENSORS IN AN INTERNAL COMBUSTION ENGINE, AND ELECTRONIC CONTROLLER OPERATING IN ACCORDANCE WITH THE METHOD

(75) Inventors: Mark Elliott, Regensburg; Gerhard Fischer, Maxhütte-Deglhof; Thomas Haug, Straubing; Stephan Bolz, Pfatter, all of (DE); Roger Rouphael, L'Union (FR); Markus Amtmann, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/752,930

(22) Filed: Jan. 2, 2001

Related U.S. Application Data

(63) Continuation of application No. PCT/EP99/04566, filed on Jul. 1, 1999.

(30) Foreign Application Priority Data

Jul. 2, 1998 (DE) .............................................. 198 29 622
Jul. 2, 1998 (DE) .............................................. 198 29 621

(51) Int. Cl.[7] .................................................... F02D 41/22
(52) U.S. Cl. ...................... 701/114; 123/406.16; 701/111
(58) Field of Search ........................ 123/406.14, 406.16, 123/479; 701/103, 110, 111, 114, 115, 39, 43, 45, 63; 73/117.2, 117.3, 118.1

(56) References Cited

U.S. PATENT DOCUMENTS

| | | | |
|---|---|---|---|
| 4,716,874 | | 1/1988 | Hilliard et al. .................. 123/406.14 |
| 5,003,954 | * | 4/1991 | Yakuwa et al. ....................... 701/114 |
| 5,121,729 | | 6/1992 | Hashimoto et al. ............ 123/406.16 |
| 5,235,527 | * | 8/1993 | Ogawa et al. ........................ 701/114 |
| 5,253,173 | * | 10/1993 | Drobny et al. ......................... 701/45 |
| 5,384,707 | * | 1/1995 | Kerns et al. .......................... 701/114 |
| 5,517,969 | * | 5/1996 | Unland et al. .................. 123/406.16 |
| 5,617,337 | * | 4/1997 | Eidler et al. .......................... 701/114 |

FOREIGN PATENT DOCUMENTS

| | | |
|---|---|---|
| 35 13 937 A1 | 10/1986 | (DE) . |
| 41 26 961 A1 | 2/1992 | (DE) . |
| 196 36 443 A1 | 3/1998 | (DE) . |
| 0 589 799 A1 | 3/1994 | (EP) . |

* cited by examiner

*Primary Examiner*—Willis R. Wolfe
(74) *Attorney, Agent, or Firm*—Herbert L. Lerner; Laurence A. Greenberg; Werner H. Stemer

(57) ABSTRACT

A method for monitoring the operation of sensors in an internal combustion engine includes providing reference values from output signals from a sensor. A sliding average (comparison value) is calculated from a relatively large number of reference values. The operation of the sensor is diagnosed as a function of the amplitude distribution of the reference values about the comparison value. If a malfunction is found, a fault message is transmitted to the driver and reversionary running of the internal combustion engine is started. An electric controller operating in accordance with the sensor is also provided.

11 Claims, 3 Drawing Sheets

METHOD FOR MONITORING THE OPERATION OF SENSORS IN AN INTERNAL COMBUSTION ENGINE, AND ELECTRONIC CONTROLLER OPERATING IN ACCORDANCE WITH THE METHOD

CROSS-REFERENCE TO RELATED APPLICATIONS

This is a continuation of copending international application PCT/EP99/04566, filed Jul. 1, 1999, which designated the United States.

BACKGROUND OF THE INVENTION

FIELD OF THE INVENTION

The invention relates to a method for monitoring the operation of a sensor in an internal combustion engine and an electronic controller monitoring the operation of a sensor.

The growing dependency on fundamental functions in motor vehicles—such as ignition, injection, and knock control—by electronic control systems is placing extremely stringent requirements on their reliability. Furthermore, reliable electronic control systems demand reversionary running programs for fault situations. Self-diagnosis is thus one of the basic functions in modern microprocessor-controlled systems. The objects of self-diagnosis in such control systems are to identify faults and to evaluate them diagnostically, to protect endangered components by suitable reversionary running programs, to provide any substitute parameters required for reversionary running, and to transmit a fault message to the driver.

Under normal operation, sensors derive measurement values from the sensor signals in an evaluation circuit. For example, sensors can derive measurement values of the voltage or current levels. The current levels are proportional to the sensor signal. The evaluation circuit checks these measured values for plausibility by comparing them with plausibility limit values. Depending on the nature of the sensor, a malfunction of the sensor is diagnosed if the plausibility limit value is infringed in either direction over a number of measurement cycles.

For knock control, such a method is known from Published, Non-Prosecuted Patent Application DE 41 26 961 A1, corresponding to U.S. Pat. No. 5,121,729. In order to suppress knocking in an internal combustion engine, a measured value is produced in an evaluation circuit from the sensor signals from a knock sensor, cyclically synchronized with time intervals. The time intervals are defined by the engine cycles of the internal combustion engine.

This measured value is then compared with a fixed plausibility limit value. If the measured value remains below the plausibility limit value throughout a predetermined number of engine cycles in this case, a malfunction of the knock sensor is diagnosed and the ignition is delayed in order to suppress the knocking.

However, in methods such as this, fault identification is feasible only if the measured value in the event of a fault is outside a plausibility range that is governed by the correctly operating sensor.

SUMMARY OF THE INVENTION

It is accordingly an object of the invention to provide a method for monitoring a sensor in an internal combustion engine by evaluating a distribution about the comparison value of the measured values versus the respective amplitudes.

With the foregoing and other objects in view, there is provided, in accordance with the invention, a method for monitoring the operation of a sensor in an internal combustion engine. The first step is forming measured values from sensor signals in an evaluation circuit. The next step is associating each measured value with a respective amplitude. The next step is calculating a comparison value from a previously formed measured value. The next step is evaluating a distribution about the comparison value of the measured values versus the respective amplitudes.

In accordance with a further object of the invention, the method includes calculating the comparison value as a sliding average from previous measured values.

In accordance with a further object of the invention, the method includes defining an amplitude window that includes the comparison value, incrementing a value of an error counter whenever a measured value is within the amplitude window, resetting the value of the error counter when the measured value is outside this amplitude window, and diagnosing a malfunction of the sensor when the value of the error counter exceeds a predetermined counter threshold value.

In accordance with a further object of the invention, the amplitude window has a bandwidth and the bandwidth of the amplitude window is a function of the amplitude distribution that occurs in a fault of the sensor.

In accordance with a further object of the invention, the amplitude window has a bandwidth, and the bandwidth of the amplitude window is a function of an engine speed of the internal combustion engine.

In accordance with a further version of the invention, the method includes calculating absolute difference values between the measured values and the comparison values. The next step is accumulating the absolute difference values with an accumulator. At the same time, the method includes the step of incrementing a value of a signal counter for each new a measured value. The method then resets the value of the accumulator and the value of the signal counter when the accumulated difference value exceeds a predetermined reset value. The method diagnoses a malfunction of the sensor when the value of the signal counter exceeds a predetermined diagnosis threshold value.

In accordance with a further object of the invention, the reset value is a function of the amplitude distribution of electronic noise that occurs in the evaluation circuit in a fault.

In accordance with a further object of the invention, the reset value is a function of an engine speed of the internal combustion engine.

In accordance with a further object of the invention, the method includes transmitting a fault message to a driver and initiating reversionary running of the internal combustion engine, when a malfunction of the sensor is diagnosed.

It is a further object of the invention to provide an electronic controller accomplishing the method that works in conjuction with an internal combustion engine producing sensor signals and having an actuator for. The electronic controller includes a sensor connected to an internal combustion engine. The sensor measures the sensor signals. The electronic controller also includes an evaluation circuit connected to the sensor. The evaluation circuit diagnoses the sensors in accordance with the method. A control circuit connects to the evaluation circuit and the actuator. The control circuit initiates reversionary running of the internal combustion engine. The electronic controller also includes a warning light connected to the evaluation circuit and displays a fault message to a driver in the event of a matching diagnosis of a malfunction of the sensors.

The invention is therefore based on the problem of developing a method that allows the malfunctioning of a sensor in an internal combustion engine to be detected correctly even when the measured values are within the plausibility range of the sensor in the event of a fault.

In the event of a fault, the measured values are governed by the electronic noise in the evaluation circuit. The amplitude distribution of the electronic noise is in this case very narrow, because the electronic noise has a coherent origin. In comparison, the measured values when the sensor is operating correctly, particularly in the case of sensors with a wide output signal dynamic range have a considerably wider amplitude distribution. Examples of sensors with wide output signal dynamic range include knock sensors, air mass flow meters, and magnetic position sensors for valve operation. If the distribution of electronic noise is used to monitor the operation of the sensors, the amplitude level of the measured values is no longer relevant, so that reliable fault identification is ensured even if the amplitudes of the measured values in the event of a fault are roughly within their range of normal operation.

Other features which are considered as characteristic for the invention are set forth in the appended claims.

Although the invention is illustrated and described herein as embodied in a method for monitoring the operation of sensors in an internal combustion engine, and an electronic controller operating in accordance with this method, the scope of the invention is nevertheless not intended to be limited to the details shown, because various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
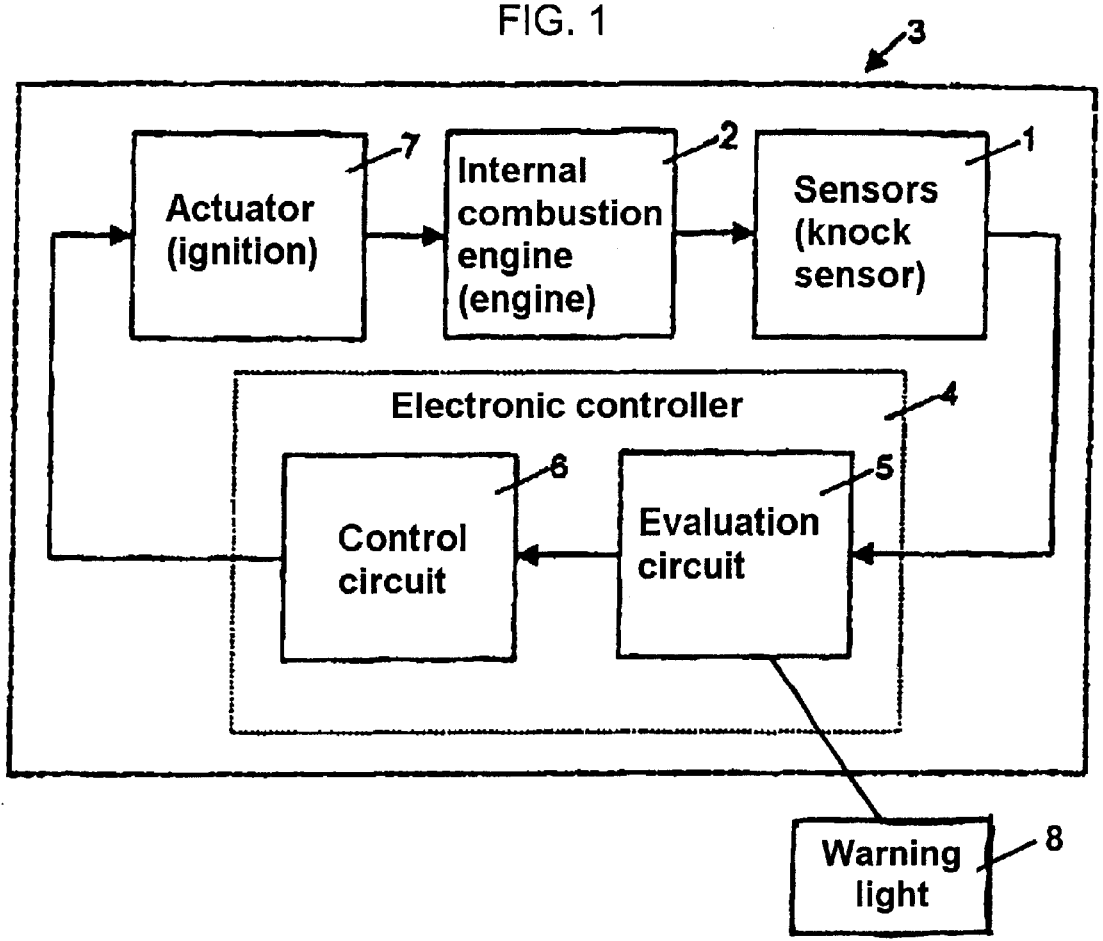
FIG. 1 shows a block diagram of a controller for knock control in an internal combustion engine in a motor vehicle.

Referring now to the figures of the drawings in detail, and first particularly to FIG. 1 thereof, there is seen one or more knock sensors 1 recording the structure-borne sound at a suitable attachment point on the internal combustion engine 2 in a motor vehicle 3 and converting this into an electrical sensor signal that is supplied to an electronic controller 4. The knock sensors are preferably attached directly on the cylinders. An evaluation circuit 5 in the controller 4 produces an output voltage (measured value) that is proportional to the sensor signal. The previously formed measured values are used to calculate a comparison value, preferably as a sliding average from a predetermined number of previously formed measured values. The comparison of the up-to-date measured value with a knock threshold, which is dependent on the comparison value, leads to the decision as to whether knocking is occurring. A control circuit 6 then influences the internal combustion engine 2 via a final control element 7, such that the knocking disappears. The ignition time is specifically suitable for use as a manipulated variable, because this allows very rapid action. When knocking is occurring, the ignition time is delayed for a predetermined number of cycles, and is then returned gradually back toward the original value once again.

If the knock sensor is operating correctly and the engine is operating without any knocking, the measured value is thus a measure of the intrinsic noise of the engine (engine noise). However, modern engines produce ever less intrinsic noise, so that the amplitudes of the measured values, and thus of the comparison value as well, are considerably lower than in earlier models when the knock sensor is operating. Furthermore, an intrinsic feature of conventional evaluation circuits is that increased electronic noise occurs in the absence of any input signal, that is to say when the knock sensor is defective or there is a short-circuit to the battery or ground. The interval between the engine noise and the electrical noise from the evaluation circuit is thus reduced. With a poor configuration (i.e., quiet engine and severely noisy evaluation circuit) the amplitude of the measured value in the event of a fault may thus be within the range of the engine noise, so that fault diagnosis by comparison with a plausibility limit value is no longer feasible.

Figure 2:
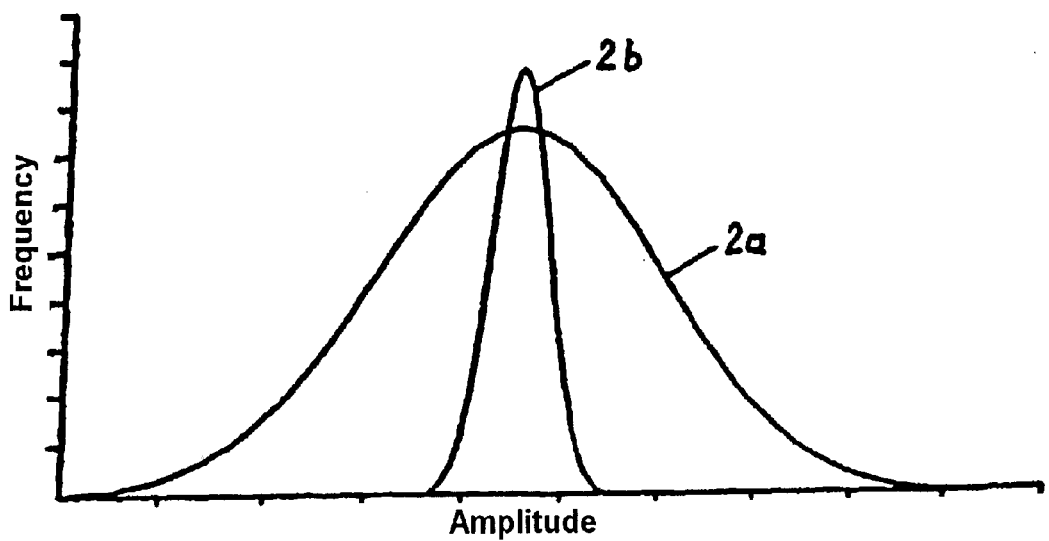
FIG. 2 shows a qualitative illustration of the amplitude distributions of the engine noise and electronic noise in the evaluation circuit.

Owing to the large number of noise sources in the engine area—for example valves closing or crankshaft movements—and the continuously varying operating conditions, the engine noise has a very wide amplitude distribution, as shown by the curve 2a in FIG. 2. In comparison, the curve 2b shows the amplitude spectrum of the electronic noise from the evaluation circuit in the event of a fault, which is narrow owing to its coherent origin. Electronic noise with a narrow distribution can be created by capacitive crosstalk between high-frequency control signals on the measurement channel. The fluctuation range of the measured values about the comparison value is thus relatively wide when the knock sensor is operating correctly, but the amplitudes of the measured values fluctuate only within a narrow range about the comparison value in the event of a fault.

Figure 3:
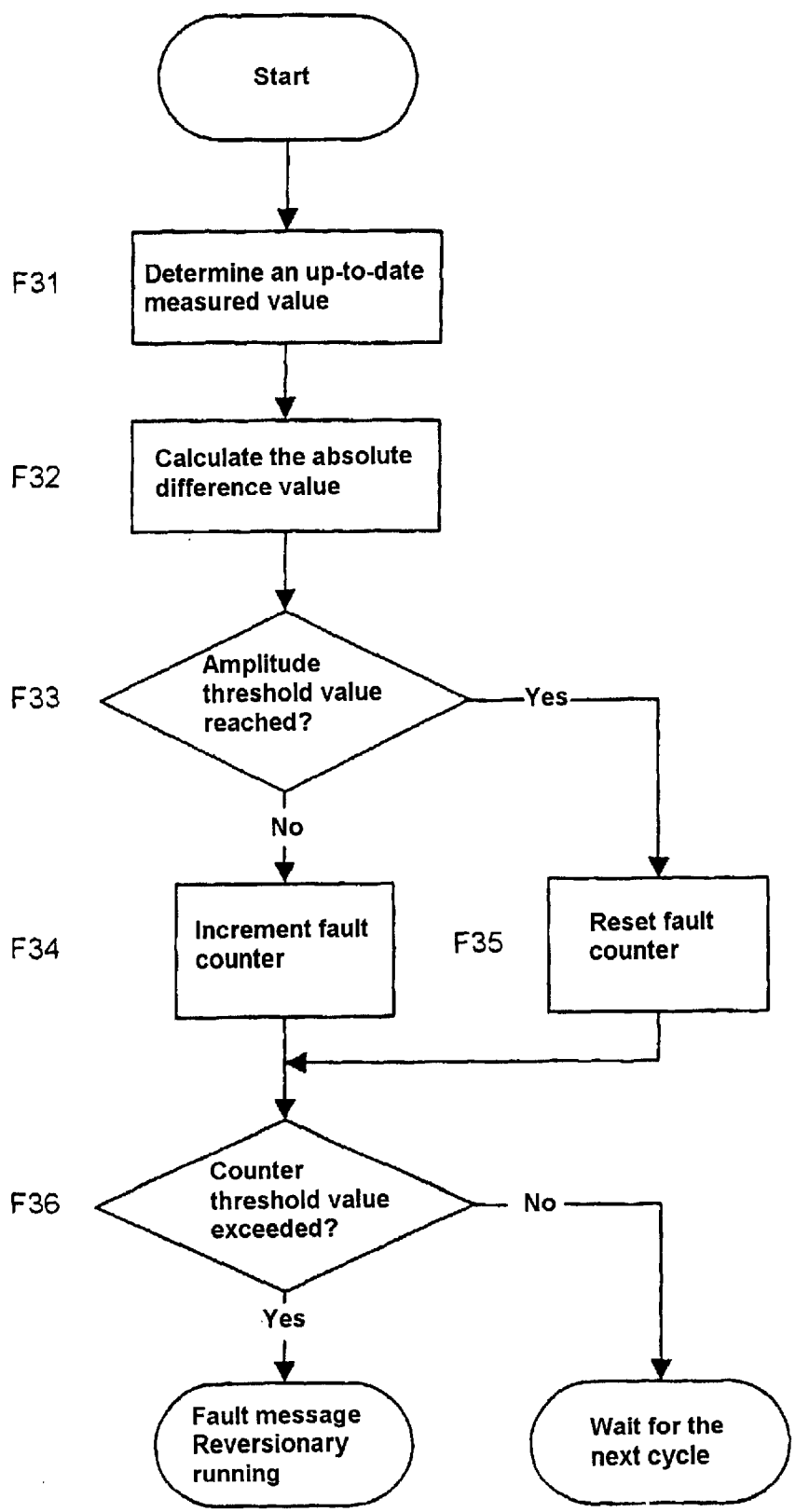
FIG. 3 shows a flowchart of a first embodiment of the method according to the invention for monitoring the operation of a knock sensor.

The flowchart in FIG. 3 describes a first embodiment of the method according to the invention. The first embodiment of the method according to the invention allows the operation of the knock sensor to be monitored independently of the amplitude level. In this case, this is done as a function of the amplitude spectrum of the measured values. An up-to-date measured value MW is first of all determined in a step F31. An absolute difference value DW between the comparison value VW and the up-to-date measured value MW is calculated in a step F32.

$$DW = |VW - MW|$$

This absolute difference value DW is then compared, in a step F33, with a predetermined amplitude threshold value. A preferred predetermined amplitude threshold value is 80 mV. This threshold value is defined as a function of the bandwidth of the measured values in the event of a fault, so that it is not reached by any possible difference value DW in the event of a fault. The amplitude threshold value also can be defined advantageously as a function of the engine speed. Similarly, the steps F32 and F33 correspond to a comparison of the up-to-date measured value with an amplitude range that includes the comparison value—referred to for short in the following text as the "amplitude window".

If the absolute difference value is below the amplitude threshold value, that is to say the measured value is within the amplitude window, then, in a step F34, a fault counter is incremented by a constant value, preferably by one. If the absolute difference value is, however, above the amplitude threshold value, that is to say the measured value is outside the amplitude window, then the fault counter is reset in a step F35, that is to say it is either set to zero or is decremented by a predetermined value. Then, in a step F36, the count of the fault counter is compared with a predetermined counter threshold value, for example 150. If the count is below the counter threshold value, then the monitoring algorithm is set to a waiting state until the start of a new measurement cycle. However, if the count exceeds the counter threshold, then a malfunction of the knock sensor is diagnosed. Once diagnosed, a fault message is transmitted to the driver. The fault message might be a warning light 8 connected to the evaluation circuit 5. Then reversionary running of the internal combustion engine is initiated. At the same time, the knock control is rendered inoperative, and the ignition time is permanently set to a value where knocking does not occur. This embodiment can also be modified such that the monitoring algorithm is changed to a waiting state immediately after resetting of the fault counter (step F35) without having to compare the count of the fault counter with the counter threshold value before this is done (step F36).

Figure 4:
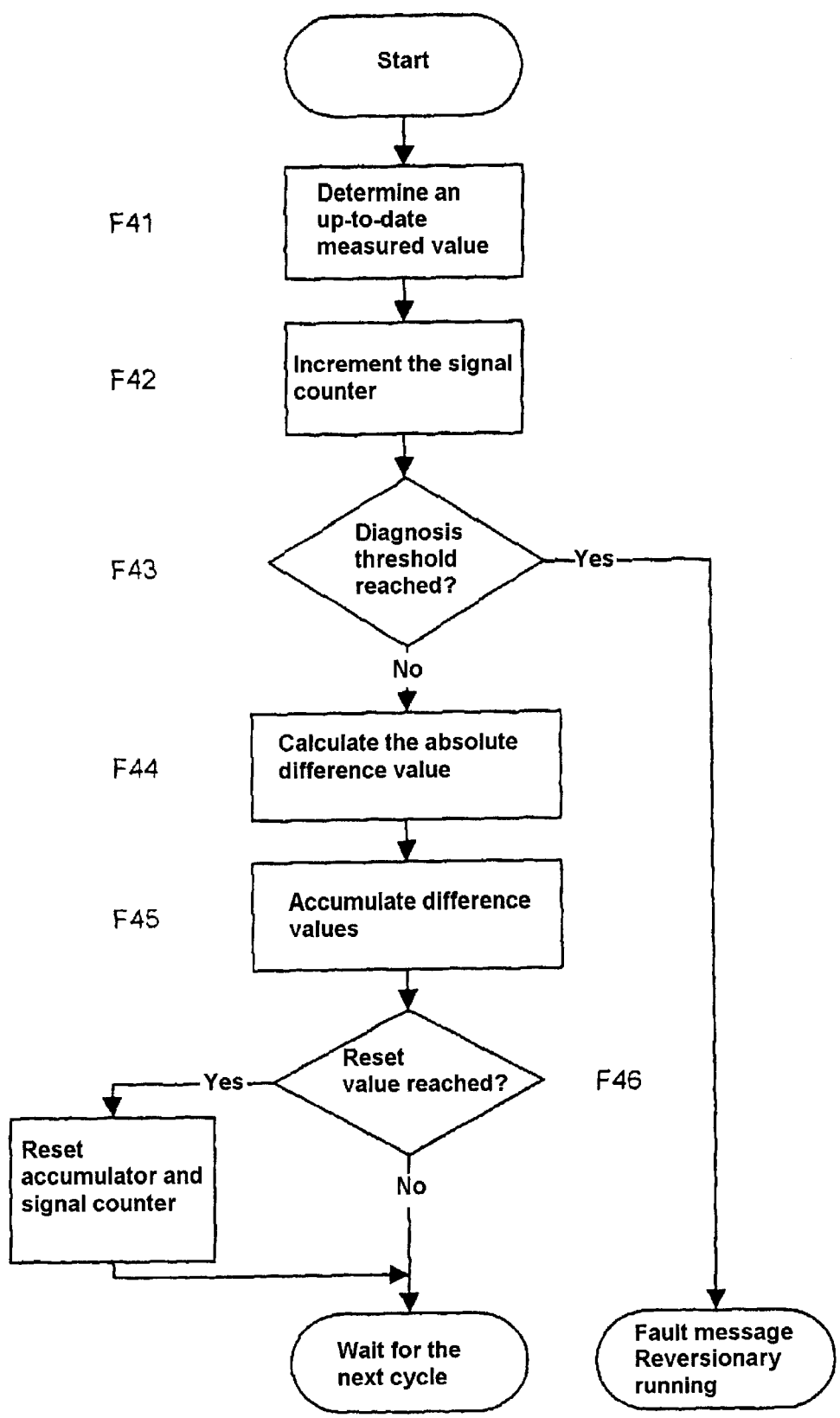
FIG. 4 shows a flowchart of a second embodiment of the method according to the invention for monitoring the operation of a knock sensor.

The flowchart in FIG. 4 will now be used to describe a second embodiment of the method according to the invention. An up-to-date measured value is determined in a step F41. In a step F42, a signal counter is incremented by a constant value, preferably by one, for each incoming measured value. The value of the signal counter is compared in a step F43 with a predetermined diagnosis threshold value, for example 150. If the value in this case remains below the diagnosis threshold then, in a step F44, which is analogous to the step F33 in the first embodiment, an absolute difference value is formed between the up-to-date measured value and the comparison value.

In a step F45, these absolute difference values are accumulated with the aid of an accumulator, for example simply being added up. The accumulated difference value is then compared, in a step F46, with a predetermined reset value, for example 8 V. This reset value is defined as a function of the bandwidth of the measured values in the event of a fault. The reset value can also advantageously be defined as a function of the engine speed. If this reset value is not reached, then the monitoring algorithm is changed to a waiting state until the start of a new measurement cycle. If not, both the accumulator and the signal counter are first of all reset in a step F47, that is to say they are either set to zero again or are decremented by a predetermined value, and the monitoring algorithm is not changed to the waiting state until this has been done. However, if the value of the signal counter reaches the diagnosis threshold value in the comparison carried out in step F43, a malfunction of the sensor is diagnosed and, in an analogous manner to that in the first embodiment, a fault message is transmitted to the driver and reversionary running of the internal combustion engine is started. As an alternative to the described embodiment, the check of the value of the signal counter (step F43) also can be carried out after checking the accumulated difference value (steps F46 and F47).

If the knock sensor is associated with only a single cylinder in the internal combustion engine, then a measurement cycle is started, and a measured value thus detected, only on every other crankshaft revolution, that is to say on every other engine cycle. By fitting the knock sensor at a suitable point on the engine block, for example between the cylinders, it is possible to record the structure-borne sound from a number of independent cylinders using one sensor. In this way, a number of measurement cycles are possible, and a number of measured values are thus detected, during each engine cycle, so that the required diagnosis time is reduced, without changing the threshold values. In addition, in the first embodiment, the probability of incorrectly diagnosed sensor faults can be reduced by incrementing the fault counter (step F34) only if the measured values from different cylinders indicate a malfunction. In other words, a malfunction can be more clearly shown by detecting a number of successive difference values below the amplitude threshold.

In both embodiments, the diagnosis of a sensor malfunction does not depend on the time but on the number of engine cycles that have taken place. This has the advantage that the number of measured values used for diagnosis is not dependent on the engine speed.

In both embodiments, it is possible when diagnosing a malfunction of the knock sensor to start an additional counter, and not to initiate the transmission of the fault message or reversionary running until the value of this counter exceeds a predetermined threshold value, for example 5. This allows the probability of erroneously diagnosed sensor failures to be reduced.

The robustness of the system can be increased considerably by appropriately linking both embodiments within one controller. In this case, the fault is not reported to the driver, nor is reversionary running of the internal combustion engine started, unless both algorithms independently of one another diagnose a sensor malfunction. The probability of erroneously diagnosed faults is thus considerably reduced.

The invention has been described using knock control as an example, but it should be mentioned that corresponding methods can also be used for other sensors in an internal combustion engine—preferably those with a wide output signal dynamic range, such as air mass flow meters or magnetic position sensors for valve operation.

We claim:

1. A method for monitoring the operation of a sensor in an internal combustion engine, which comprises:
    forming measured values from sensor signals in an evaluation circuit,
    associating each measured value with a respective amplitude,
    calculating a comparison value from a previously formed measured value, and
    evaluating a distribution about the comparison value of the measured values versus the respective amplitudes.

2. The method according to claim 1, which further comprises:
    calculating the comparison value as a sliding average from previous measured values.

3. The method according to claim 1, which further comprises:
    transmitting a fault message to a driver and initiating reversionary running of the internal combustion engine, when a malfunction of the sensor is diagnosed.

4. The method according to claim 1, which further comprises:
    defining an amplitude window that includes the comparison value, incrementing a value of an error counter whenever a measured value is within the amplitude window, resetting the value of the error counter when the measured value is outside this amplitude window, and diagnosing a malfunction of the sensor when the value of the error counter exceeds a predetermined counter threshold value.

5. The method according to claim 4, wherein the amplitude window has a bandwidth and the bandwidth of the amplitude window is a function of the amplitude distribution that occurs in a fault of the sensor.

6. The method according to claim 4, wherein the amplitude window has a bandwidth, and the bandwidth of the amplitude window is a function of an engine speed of the internal combustion engine.

7. An electronic controller for an internal combustion engine, comprising:

a sensor connected to an internal combustion engine producing sensor signals and having an actuator, said sensor measuring said sensor signals;

an evaluation circuit connected to said sensor, said evaluation circuit diagnosing said sensors in parallel in accordance with the methods described in claim 3, a control circuit connected to said evaluation circuit and the actuator, said control circuit initiating reversionary running of the internal combustion engine; and a warning light connected to said evaluation circuit displaying a fault message to a driver in the event of a matching diagnosis of a malfunction of the sensors.

8. The method according to claim 1, which further comprises:

calculating absolute difference values between the measured values and the comparison values, accumulating the absolute difference values with an accumulator, incrementing a value of a signal counter for each new measured value, resetting the value of the accumulator and the value of the signal counter when the accumulated difference value exceeds a predetermined reset value, and diagnosing a malfunction of the sensor when the value of the signal counter exceeds a predetermined diagnosis threshold value.

9. The method according to claim 8, wherein the reset value is a function of the amplitude distribution of electronic noise, which occurs in the evaluation circuit in a fault.

10. The method according to claim 8, wherein the reset value is a function of an engine speed of the internal combustion engine.

11. An electronic controller for an internal combustion engine, comprising:

a sensor connected to an internal combustion engine producing sensor signals and having an actuator, said sensor measuring said sensor signals;

an evaluation circuit connected to said sensor, said evaluation circuit diagnosing said sensors in parallel in accordance with the methods described in claim 6, a control circuit connected to said evaluation circuit and the actuator, said control circuit initiating reversionary running of the internal combustion engine; and a warning light connected to said evaluation circuit displaying a fault message to a driver in the event of a matching diagnosis of a malfunction of the sensors.

* * * * *